United States Patent
Kobayashi

(10) Patent No.: US 9,829,874 B2
(45) Date of Patent: Nov. 28, 2017

(54) NUMERICAL CONTROL DEVICE

(71) Applicant: FANUC Corporation, Minamitsuru-gun, Yamanashi (JP)

(72) Inventor: Hideo Kobayashi, Minamitsuru-gun (JP)

(73) Assignee: FANUC CORPORATION, Minamitsuru-gun, Yamanashi (JP)

(*) Notice: Subject to any disclaimer, the term of this patent is extended or adjusted under 35 U.S.C. 154(b) by 191 days.

(21) Appl. No.: 14/847,110

(22) Filed: Sep. 8, 2015

(65) Prior Publication Data
US 2016/0077512 A1 Mar. 17, 2016

(30) Foreign Application Priority Data
Sep. 11, 2014 (JP) ................. 2014-184831

(51) Int. Cl.
G05B 19/04 (2006.01)
G05B 19/042 (2006.01)

(52) U.S. Cl.
CPC ........ G05B 19/0428 (2013.01); G05B 2219/24198 (2013.01)

(58) Field of Classification Search
CPC ............. G05B 19/0428; G05B 2219/24198
USPC ........................................... 700/17
See application file for complete search history.

(56) References Cited

U.S. PATENT DOCUMENTS

| 7,389,150 B2* | 6/2008 | Inoue ............ G05B 19/409 700/15 |
| 2004/0073404 A1* | 4/2004 | Brooks ............ G05B 19/409 702/183 |
| 2006/0224256 A1 | 10/2006 | Inoue et al. |
| 2013/0131840 A1* | 5/2013 | Govindaraj ...... G05B 19/41865 700/19 |
| 2014/0042950 A1 | 2/2014 | Aoyama et al. |
| 2015/0105893 A1* | 4/2015 | Tran ............ G05B 15/02 700/108 |

FOREIGN PATENT DOCUMENTS

| CN | 101188828 A | 5/2008 |
| CN | 101272480 A | 9/2008 |
| CN | 102750192 A | 10/2012 |
| CN | 103021370 A | 4/2013 |

(Continued)

OTHER PUBLICATIONS

Notification of Reasons for Refusal dated Jan. 19, 2016 in Japanese Patent Application No. 2014-184831 (3 pages) with an English Translation (3 pages).

(Continued)

Primary Examiner — Jason Lin
(74) Attorney, Agent, or Firm — Drinker Biddle & Reath LLP

(57) ABSTRACT

A numerical control device including a CPU for numerical control, a CPU for HMI, a display circuit and a restarting circuit configured to restart the CPU for HMI using the CPU for numerical control. The numerical control device further includes a display task monitoring unit, a determination unit configured to determine an abnormality of the operation condition of the display task by the CPU for HMI, using the display task monitoring unit, and a restarting unit configured to restart the CPU for HMI based on a determination result by the determination unit.

4 Claims, 5 Drawing Sheets

(56) References Cited

FOREIGN PATENT DOCUMENTS

| | | | |
|---|---|---|---|
| CN | 103701651 A | 4/2014 | |
| JP | 2006-285758 A | 10/2006 | |
| JP | 2012-018454 A | 1/2012 | |
| JP | 2012018454 A * | 1/2012 | ......... G05B 19/4145 |
| JP | 2014-035564 A | 2/2014 | |
| JP | 2014-038562 A | 2/2014 | |
| JP | 2014-164713 A | 9/2014 | |

OTHER PUBLICATIONS

The Notification of the First Office Action dated May 4, 2017 in Chinese Patent Application No. 2015105739724 (7 pages) with an English translation (10 pages).

* cited by examiner

NUMERICAL CONTROL DEVICE

RELATED APPLICATION DATA

This application claims priority under 35 U.S.C. §119 and/or §365 to Japanese Application No. 2014-184831 filed Sep. 11, 2014, the entire contents is incorporated herein by reference.

BACKGROUND OF THE INVENTION

1. Field of the Invention

The present invention relates to a numerical control device having function of monitoring operation condition and automatically restarting a CPU for HMI when HMI operation abnormality occurs.

2. Description of the Related Art

In a numerical control device for controlling a machining tool or an industrial machine, a circuit or a personal computer for HMI is often added when high-performance HMI function for graphic representation is necessary. The numerical control device with HMI function, in general, can not update the screen and the screen freezes or no screen is displayed when a universal operating system stops by malfunction of the application software for HMI function or a storage device.

FIG. 7 is a schematic diagram showing a numerical control device with the HMI function in a conventional art. A numerical control device 100 includes a CPU 10 for numerical control which controls a machining tool and a HMI function unit 20 which performs high-performing graphic representation, and performs data exchange using interface region 50. A CPU 40 for HMI is installed in the HMI function unit 20. The HMI function unit 20 is connected to a display unit 30 and executes a universal operating system using the CPU 40 for HMI.

The CPU 10 for numerical control and the HMI function unit 20 exchange data with each other via the interface region 50, in the numerical control device with the HMI function described above. It has been impossible for the CPU for numerical control 10 to identify a display abnormality in the HMI function unit 20. For this reason, no information is given to the operator in maintenance work after the abnormality occurs, and it takes a long time before the cause is investigated. In addition to that, no machine information is seen on the display in the abnormality occurrence, there is also a safety problem.

As a conventional technique to cope with the abnormality which occurs in HMI function, such a technique is disclosed that having two kinds of operation systems (Hereinafter referred to as "OS") in that, when one OS does not work on boot, another OS for maintenance is configured to work (See, for example, Japanese Patent Laid-Open No. 2012-018454).

However, the conventional technique, described in Japanese Patent Laid-Open No. 2012-018454, can operate the maintenance OS when an abnormality occurs on boot, but does not consider the case where an abnormality occurs during normal operation.

SUMMARY OF THE INVENTION

In view of the above-described problems in the prior art techniques, an object of the present invention is accordingly to provide a numerical control device capable of detecting an abnormality in HMI function which occurs during operation and automatically restarting the HMI function.

A numerical control device according to the present invention includes a CPU for numerical control configured to perform numerical control, a CPU for HMI configured to execute an operating system and an application software for conducting HMI function, and output command for displaying graphic data, a display circuit configured to perform display on a display unit based on display command from the CPU for HMI, and a restarting circuit configured to restart the CPU for HMI using the CPU for numerical control. The numerical control device further includes a display task monitoring unit configured to monitor operation condition of display task by the CPU for HMI, a determination unit configured to determine an abnormality of the operation condition of the display task by the CPU for HMI, using the display task monitoring unit and a restarting unit configured to restart the CPU for HMI according to a command issued to the restarting circuit based on a determination result by the determination unit.

The numerical control device may further include a motion flag implemented in interface region which is accessible from both the CPU for numerical control and the CPU for HMI, and the CPU for HMI may set the motion flag at each motion of the display task, and the display task monitoring unit may periodically monitor state of the motion flag, clear the motion flag when the motion flag is set, and determine that the display task by the CPU for HMI has stopped when the motion flag is not set for predetermined time.

The restarting unit may reset the CPU for HMI based on a command from the CPU for numerical control.

According to another aspect of the invention, a numerical control device according to the present invention includes a multi-core CPU having a CPU core for numerical control configured to perform numerical control, and a CPU core for HMI configured to execute an operating system and an application software for conducting HMI function, and output command for displaying graphic data, a display circuit configured to perform display on a display unit based on display command from the CPU core for HMI, and a restarting circuit configured to restart the CPU core for HMI using the CPU core for numerical control. The numerical control device further includes a display task monitoring unit configured to monitor operation condition of display task by the CPU core for HMI, a determination unit configured to determine an abnormality of the operation condition of the display task by the CPU core for HMI, using the display task monitoring unit; and a restarting unit configured to restart the CPU core for HMI according to a command issued to the restarting circuit based on a determination result by the determination unit.

The numerical control device may further includes a motion flag implemented in interface region, the interface region being accessible from both the CPU core for numerical control and the CPU core for HMI, the CPU core for HMI may set the motion flag at each motion of the display task, and the display task monitoring unit may periodically monitor state of the motion flag, clear the motion flag when the motion flag is set, and determine that the display task by the CPU core for HMI has stopped when the motion flag is not set for predetermined time.

The restarting unit may reset the CPU core for HMI based on a command from the CPU core for numerical control.

The present invention, with the above described configuration, makes it possible to detect an abnormality in HMI function which occurs during operation, automatically restart the HMI function for display update, such that display of alarm information by the CPU for numerical control and operation of the machining tool become possible.

BRIEF DESCRIPTION OF THE DRAWINGS

The above-described object, the other object, and the feature of the invention will be proved from the description of embodiments below with reference to the accompanying drawings. In these drawings.

DETAILED DESCRIPTION OF THE PREFERRED EMBODIMENTS

Figure 1:
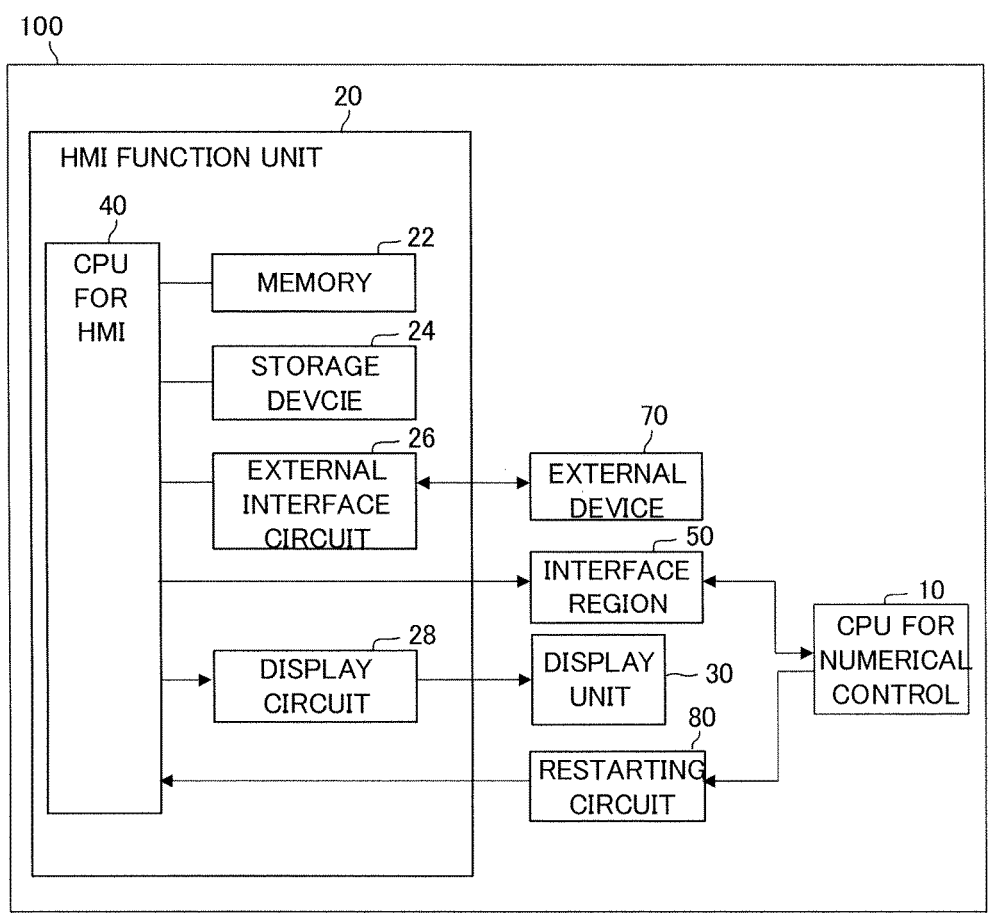
FIG. 1 is a block diagram showing a numerical control device according to an embodiment of the present invention.

Hereinafter, components identical or similar to components in the description of the related art will be indicated by identical reference numerals.

FIG. 1 is a block diagram showing a numerical control device according to an embodiment of the present invention. The numerical control device 100 includes a CPU 10 for numerical control, a HMI function unit 20, a display unit 30, interface region 50, an external device 70, a restarting circuit 80.

The CPU 10 for numerical control reads out a system program, a machining program, or the like, from a memory such as a ROM or a RAM installed in the numerical control device 100, not shown, and executes control of whole numerical control device 100 and control of machining by a machining tool.

The HMI function unit 20 is a function block for executing main control operation of the HMI function, and includes a memory 22 such as a ROM or a RAM, a storage device 24 for storing a universal OS, application software, data, and the like, an external interface circuit 26, a circuit (not shown) connected with the interface region 50 in the numerical control device 100, a display circuit 28 for performing display on the display device 30, and a CPU 40 for HMI for executing a universal OS. The external interface circuit 26 is connected with an external device 70 such as a mouse, a keyboard, a USB, an Ethernet (registered trademark). The CPU 40 for HMI executes the universal OS and application software for executing HMI task such as display task, in the HMI function unit 20. Thus the HMI function unit 20 conducts the HMI function in the numerical control device 100.

The display unit 30 displays the display data output from the display circuit 28 in a graphical format. The display data is generated in display task which is executed at each prescribed period, and the state of the numerical control device 100 is represented on the display device 30 on time.

The interface region 50 is a region which is configured to exchange data with both the CPU 10 for numerical control and CPU 40 for HMI, and is settled in a memory such as a RAM provided in the numerical control device 100. The data, stored in the interface region 50 by the CPU 10 for numerical control and the CPU 40 for HMI, are configured to be referred to, read out, and overwritten from the both CPU. Thus the CPU 10 for numerical control and the CPU 40 for HMI can communicate with each other via the interface region 50.

The restarting circuit 80 resets the CPU 40 for HMI according to a command from the CPU 10 for numerical control or the like, and restarts the whole HMI function unit 20.

Figure 2:
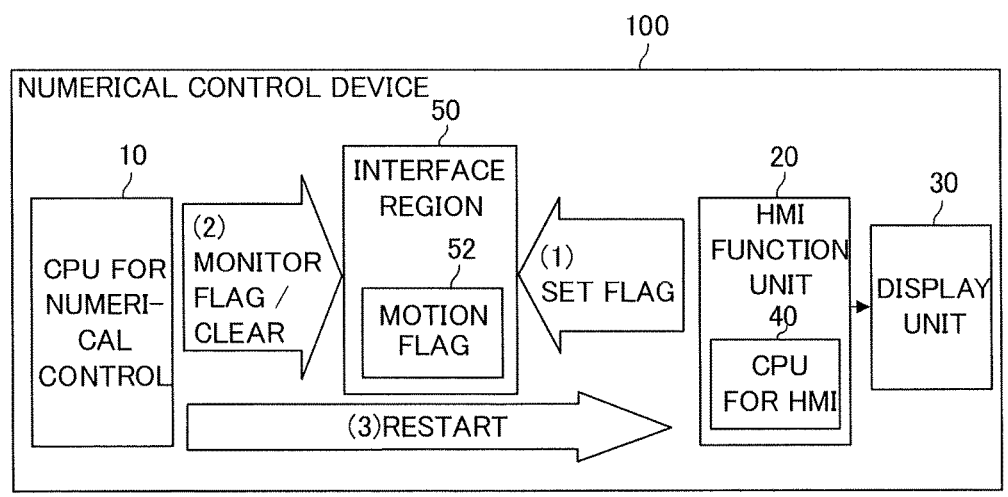
FIG. 2 is a schematic diagram showing monitoring operation of HMI function unit according to an embodiment of the present invention.

FIG. 2 is a schematic diagram showing monitoring operation of the HMI function unit executed in the numerical control device 100 shown in FIG. 1.

In the numerical control device 100, the CPU 10 for numerical control which controls the machining tool, and the HMI function unit 20 which performs high performance graphic representation are configured to communicate with each other via the interface region 50 as described above. A motion flag is set as a region for monitoring operation condition of the HMI function unit 20, in the interface region 50.

The flow of the monitoring operation of the HMI function unit 20 will be described below.

When the display task is activated in the CPU 40 for HMI in the HMI function unit 20, the display task generates the display data based on states of each parts of the numerical control device 100, the information of machining control result by the CPU 10 for numerical control, and the like, and displays the data on the display unit 30, while the display task sets a motion flag 52 in the interface region 50 ((1)). The motion flag 52 is set every time the display task is executed.

The CPU 10 for numerical control periodically monitors the state of the motion flag 52 in the interface region 50 ((2)). The CPU 10 for numerical control 10 clears the motion flag 52 if the motion flag 52 is set during the monitoring. The CPU 10 determines that an abnormality occurs in the HMI function unit 20 if the state in which the motion flag 52 is cleared continues for a prescribed time during the monitoring.

When the CPU 10 for numerical control determines that any abnormality occurs in the HMI function unit 20, the CPU 10 for numerical control issues a command for the restarting circuit 80 to restart the HMI function unit 20 ((3)).

Figure 3:
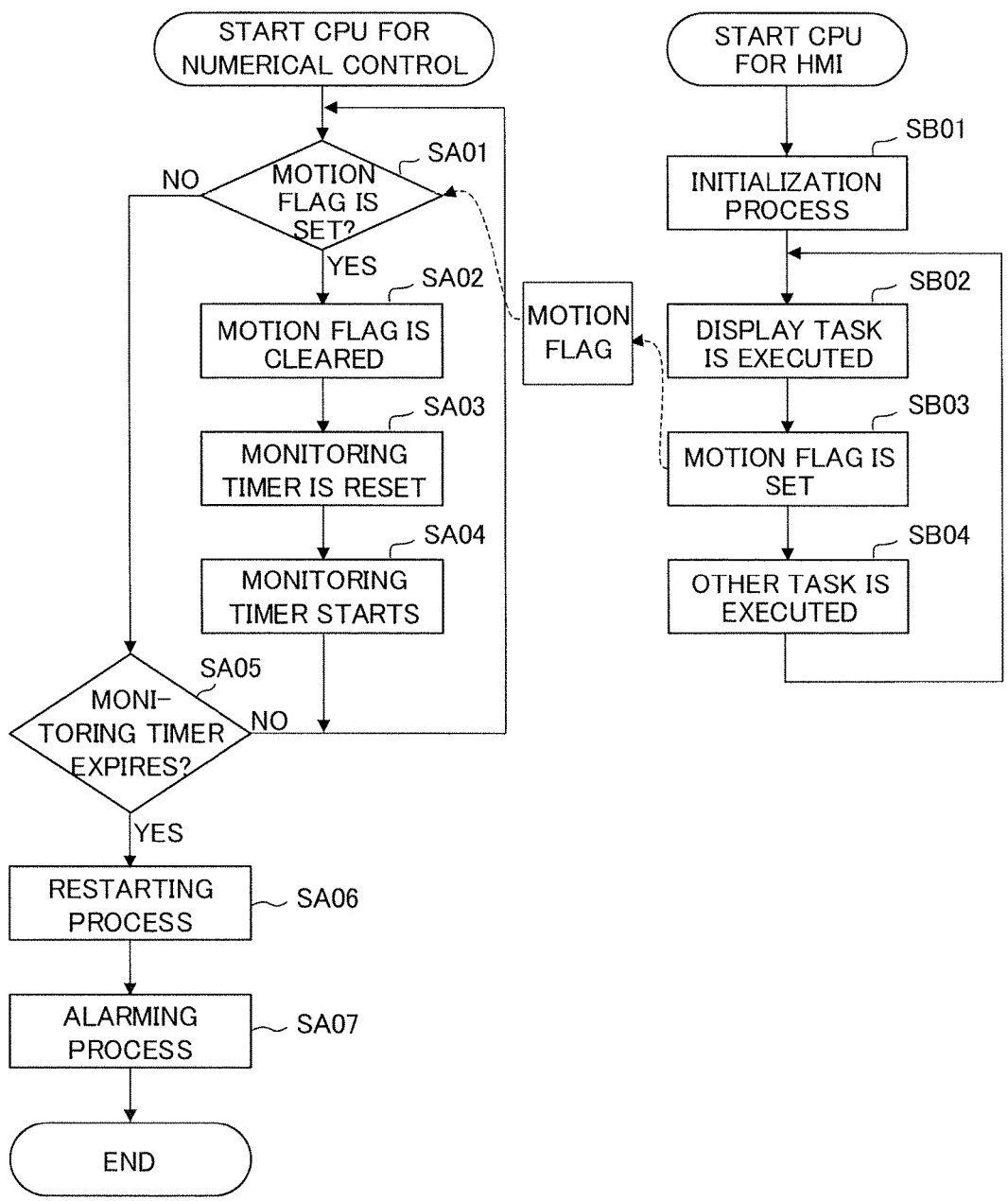
FIG. 3 is a flowchart showing monitoring operation of HMI function unit according to an embodiment of the present invention.

FIG. 3 is a flowchart showing monitoring operation of the HMI function unit 20 according to an embodiment of the present invention.

Each step will be described below. The steps SA01 to SA 07 represent processes executed in the CPU 10 for numerical control, while the steps SB01 to SB04 represent processes executed in the CPU 40 for HMI.

[Step SA01] The state of the motion flag 52 is periodically monitored. The process proceeds to Step SA02 if the motion flag 52 is set, and proceeds to Step 05 if the motion flag 52 is not set.

[Step SA02] The motion flag 52 is cleared.

[Step SA03] The monitoring timer of the motion flag 52 is reset.

[Step SA04] The monitoring timer of the motion flag 52 is started and the process proceeds to Step SA01.

[Step SA05] The value of the monitoring timer is checked. The process proceeds to Step SA06 if the value of the monitoring timer shows the prescribed time has elapsed, and returns to Step SA01 if not.

[Step SA06] It is determined that an abnormality is detected in the HMI function unit 20, and a command to restart the HMI function unit 20 is issued for the restarting circuit 80.

[Step SA07] Alarm information is displayed and minimum operation of the machine is performed.

[Step SB01] The initialization process of the universal OS is executed.

[Step SB02] The display task is executed.

[Step SB03] The motion flag 52 in the interface region 50 is set every time the display task is executed.

[Step SB04] The other task such as execution of the application software, storage operation, network communication are executed and the process returns to Step SB02.

Figure 4:
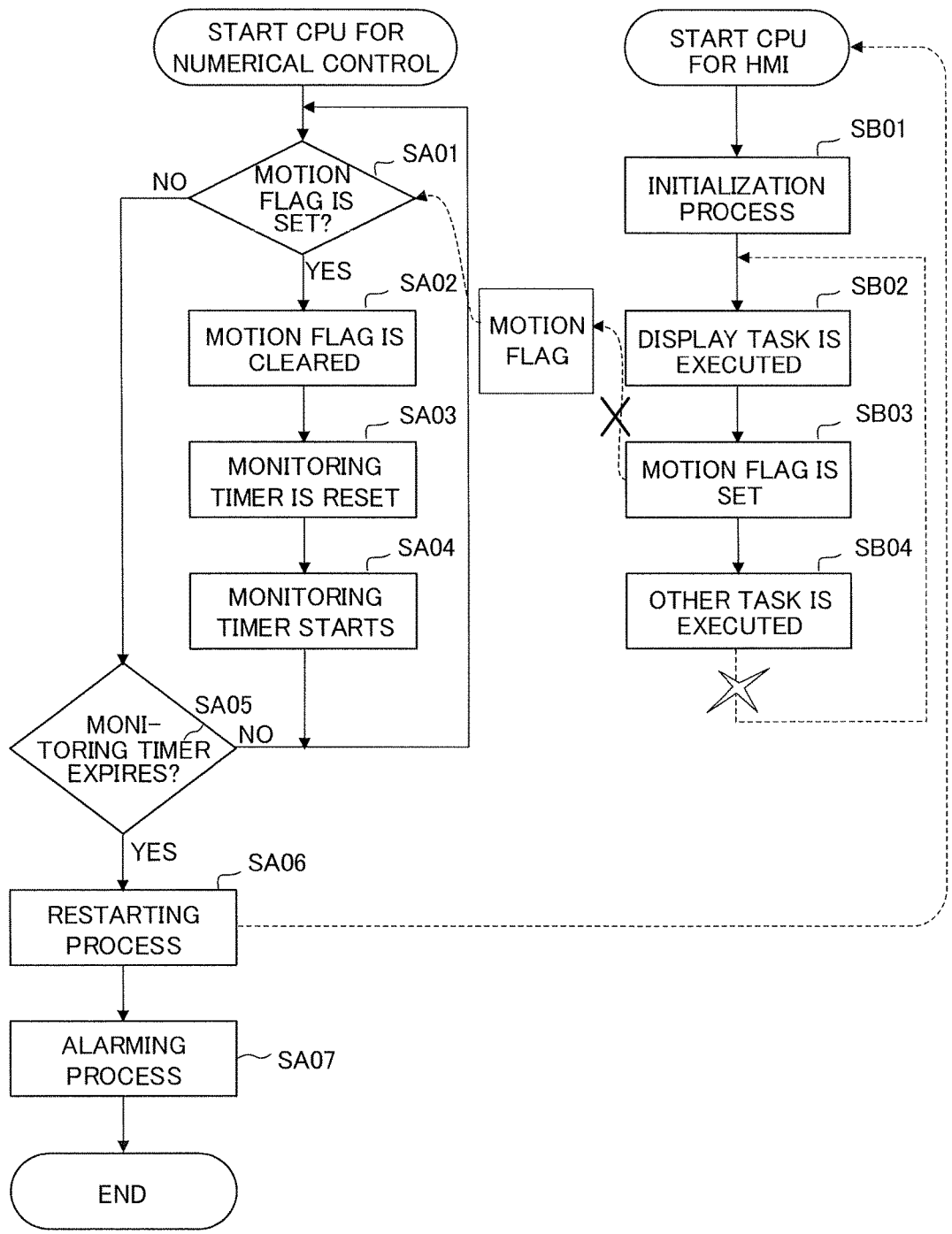
FIG. 4 is a diagram showing monitoring operation in a case where an abnormality occurs in HMI function unit according to an embodiment of the present invention.

FIG. 4 is a diagram showing monitoring operation in a case where an abnormality occurs in the HMI function unit 20.

When, for example, the tasks of the execution of the application software, storage operation, network communication are started but not successfully completed in Step SB04, the CPU 40 for HMI stops or the process can not exit the Step SB04, so the display task in Step SB02 can not be executed and the set of the motion flag 52 in Step SB03 is not executed.

The CPU 10 for numerical control checks if the motion flag 52 is set in Step SA01. The process proceeds to Step SA05 if not set, and whether the prescribed time has expired or not is checked, then it is determined that monitoring time has expires and an abnormality in the HMI function unit 20 is detected, if the prescribed time has elapsed in the monitoring timer. After that, the CPU 10 for numerical control issues for the restarting circuit 80 to restart the HMI function unit in Step SA06, and the alarm information is displayed and minimum operation of the machine is performed in Step SA07.

As described above, in the numerical control device with the HMI function, according to the embodiment of the present invention, the CPU 10 for numerical control monitors the operation condition of the HMI function unit 20 through the motion flag 52 set in the interface region 50. The motion flag 52 is not updated (or set) when an abnormality occurs in the HMI function unit 20, so the CPU 10 for numerical control can detect the abnormality in the HMI function unit 20 and command the restarting circuit 80 to restart the HMI function unit 20.

It should be noted that though it is determined that an abnormality is detected in the HMI function unit 20 when the motion flag 52 is not set for a prescribed time using the monitoring timer, but such a configuration may be adopted that a counter is installed and the counter is reset in Step SA03 and incremented in Step SA05 to determine that an abnormality occurs when the value of the counter exceeds the prescribed number.

The configuration of the numerical control device 100 according to the present invention is not limited to the configuration shown in FIGS. 1 and 2, but various configurations are adopted. The examples of the configurations will be describe below.

Figure 5:
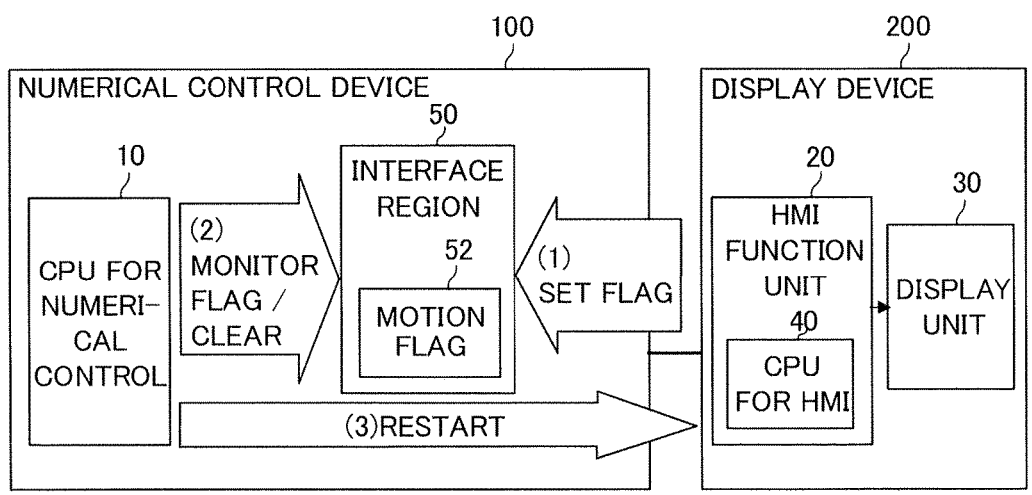
FIG. 5 is a schematic diagram showing monitoring operation of HMI function unit according to the second embodiment of the present invention.

FIG. 5 is a diagram showing an embodiment of the present invention, using the display device with the HMI function.

According to the present embodiment, the numerical device 100 includes the CPU 10 for numerical control which controls the machining tool and the interface region 50, while the HMI function unit 20 which performs high-performance graphic representation is installed in the display device 200 and is independent from the numerical control device 100. The HMI function unit 20 is connected to the interface region 50 in the numerical control device 100 via, for example, a communication wire, and is configured to exchange data through the communication.

The universal OS operates in the CPU 40 for HMI in the HMI function unit 20, and the display data generated by the HMI function unit 20 is displayed on the display unit 30. Here, the display device 200 may be a personal computer which execute the universal OS and equipped with the CPU 40 for HMI and the display unit 30.

Flow of the monitoring operation by the HMI function unit 20 in the numerical control device with the above configuration will be described.

When the display task is executed on the CPU 40 for HMI in the HMI function unit 20, the display task generates display data based on states of each parts of the numerical control device 100, the information of the machining control result by the CPU 10 for numerical control, and the like, and displays the data on the display unit 30, while the display task sets the motion flag 52 in the interface region 50 via a communication wire ((1)). The motion flag 52 is set every time the display task is executed.

The CPU 10 for numerical control periodically monitors the state of the motion flag 52 in the interface region 50 ((2)). The CPU 10 for numerical control 10 clears the motion flag 52 if the motion flag 52 is set during the monitoring. The CPU 10 determines that an abnormality occurs in the HMI function unit 20 if the state in which the motion flag 52 is cleared continues for a prescribed time during the monitoring.

When the CPU 10 for numerical control determines that any abnormality occurs in the HMI function unit 20, the CPU 10 for numerical control issues a command for the restarting circuit 80 to restart the display device 200 ((3)).

Figure 6:
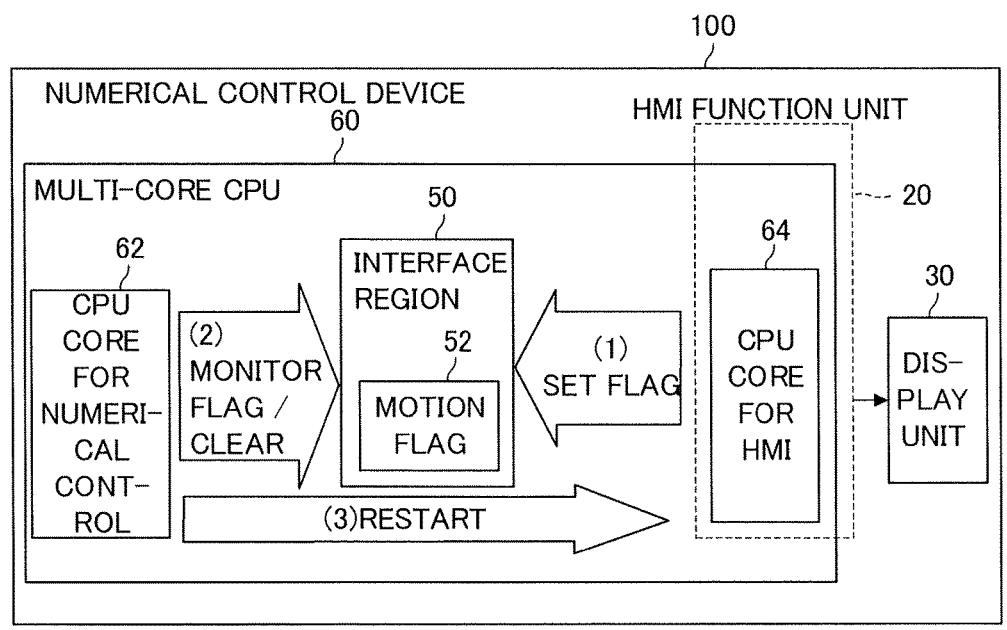
FIG. 6 is a schematic diagram showing monitoring operation of HMI function unit according to the third embodiment of the present invention.
Figure 7:
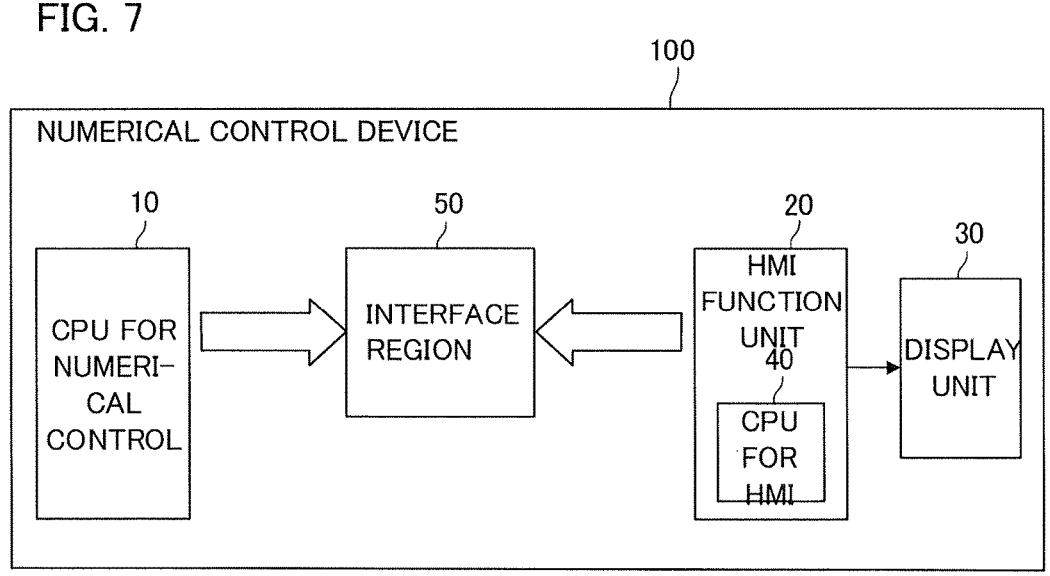
FIG. 7 is a schematic diagram showing a numerical control device with HMI function in a conventional art.

FIG. 6 is a diagram showing an embodiment of the present invention, using a multi-core CPU.

In the embodiment, the multi-core CPU 60 is installed in the numerical control device 100. The multi-core CPU 60 includes the CPU 62 core for numerical control which controls the machining tool and the CPU core 64 for HMI which controls the HMI function unit 20, and the interface region 50. The HMI function unit 20 performs high-performance graphic representation. The CPU core 64 for HMI executes the universal OS, and high-performance graphic representation is performed on the display unit 30, under the control of the CPU core 64 for HMI.

Flow of the monitoring operation by the HMI function unit 20 in the numerical control device with the above configuration will be described.

When the display task is activated in the CPU core 64 for HMI in the HMI function unit 20, the display task generates the display data based on states of each parts of the numerical control device 100, the information of machining control result by the CPU core 62 for numerical control, and the like, and displays the data on the display unit 30, while the display task sets a motion flag 52 in the interface region 50 ((1)). The motion flag 52 is set every time the display task is executed.

The CPU core 62 for numerical control periodically monitors the state of the motion flag 52 in the interface region 50 ((2)). The CPU core 62 for numerical control 10 clears the motion flag 52 if the motion flag 52 is set during the monitoring. The CPU core 62 determines that an abnormality occurs in the HMI function unit 20 if the state in which the motion flag 52 is cleared continues for a prescribed time during the monitoring.

When the CPU core 62 for numerical control determines that any abnormality occurs in the HMI function unit 20, the CPU core 62 for numerical control issues a restarting command for the CPU core 64 for HMI.

The invention claimed is:

1. A numerical control device including: a Central Processing Unit (CPU) for numerical control configured to perform numerical control; a CPU for Human Machine Interface (HMI) configured to execute an operating system and an application software for conducting HMI function, and output command for displaying graphic data;
   a display circuit configured to perform display on a display unit based on display command from the CPU for HMI; and
   a restarting circuit configured to restart the CPU for HMI using the CPU for numerical control;
   the CPU for numerical control configured to monitor operation condition of display task by the CPU for HMI;
   the CPU for numerical control configured to determine an abnormality of the operation condition of the display task by the CPU for HMI,
   the numerical control device further comprising: a restarter configured to restart the CPU for HMI according to a command issued to the restarting circuit based on a determination result of the abnormality has occurred by the CPU for numerical control; and
   a motion flag implemented in interface region, the interface region being accessible from both the CPU for numerical control and the CPU for HMI, wherein
   the CPU for HMI is configured to set the motion flag at each motion of the display task, and
   the CPU for numerical control is configured to periodically monitor state of the motion flag, clear the motion flag when the motion flag is set, and determine that the display task by the CPU for HMI has stopped when the motion flag is not set for predetermined time.

2. A numerical control device according to claim 1, wherein the restarter is configured to reset the CPU for HMI based on a command from the CPU for numerical control.

3. A numerical control device including: a multi-core Central Processing Unit (CPU) having a CPU core for numerical control configured to perform numerical control, and a CPU core for Human Machine Interface (HMI) configured to execute an operating system and an application software for conducting HMI function, and output command for displaying graphic data;
   a display circuit configured to perform display on a display unit based on display command from the CPU core for HMI; and
   a restarting circuit configured to restart the CPU core for HMI using the CPU core for numerical control;
   the CPU core for numerical control configured to monitor operation condition of display task by the CPU core for HMI;
   the CPU core for numerical control configured to determine an abnormality of the operation condition of the display task by the CPU core for HMI,
   the numerical control device further comprising: a restarter configured to restart the CPU core for HMI based on a determination result of the abnormality has occurred by the CPU core for numerical control; and
   a motion flag implemented in interface region, the interface region being accessible from both the CPU core for numerical control and the CPU core for HMI, wherein
   the CPU core for HMI is configured to set the motion flag at each motion of the display task, and
   the CPU core for numerical control is configured to periodically monitor state of the motion flag, clear the motion flag when the motion flag is set, and determine that the display task by the CPU core for HMI has stopped when the motion flag is not set for predetermined time.

4. A numerical control device according to claim 3, wherein the restarter is configured to reset the CPU core for HMI based on a command from the CPU core for numerical control.

* * * * *